Patented Sept. 29, 1953

2,653,939

UNITED STATES PATENT OFFICE 2,653,939

WATER-SOLUBLE COMPOUND OF THEOPHYLLINE AND 3-AMINOMETHYL-PYRIDINE AND PROCESS FOR THE MANUFACTURE THEREOF

Reinhard Schläpfer, Basel, Switzerland, assignor to Hoffmann-La Roche Inc., Nutley, N. J., a corporation of New Jersey No Drawing. Application May 1, 1952, Serial No. 285,546. In Switzerland May 28, 1951

2 Claims. (Cl. 260—253)

The present invention provides a new compound of theophylline and 3-aminomethylpyridine and a process for the manufacture thereof.

The new compound referred to above consists of theophylline and 3-aminomethylpyridine in the proportion of 3 mols theophylline and 2 mols 3-aminomethylpyridine. It is colorless and crystalline and, when heated, it softens between 155–160° C., without however showing in an open capillary tube any characteristic melting point, because the 3-aminomethylpyridine separates and distills off during heating. When introducing the compound into water at a pH below pH 8, the same is partly hydrolysed with separation of theophylline; stable aqueous solutions can however be obtained by adding some free 3-aminomethylpyridine or by increasing the pH to 8.3.

From investigations carried out on the isolated cat heart it appears that the new compound possesses a coronary action, which is enhanced as compared with that of theophylline.

The present invention further provides a process for the manufacture of the above compound, which comprises reacting theophylline with 3-aminomethylpyridine. A particularly suitable procedure consists in using 3-aminomethylpyridine in excess; the compound of theophylline and 3-aminomethylpyridine will then separate from the reaction mixture and may thus be isolated.

Subject to the conditions referred to above, the novel compound forms concentrated aqueous solutions which are suitable for oral and also for parenteral application. The said solutions do not require the addition of the usual solubilizers, which fact is advantageous inasmuch as the said solubilizers do not only act as ballast, but may give rise to partly undesirable pharmacological or clinical side reactions.

Example 1

40 parts by weight of crystal water free theophylline are dissolved, suitably with slight heating, in 160 parts by weight of 3-aminomethylpyridine. Upon seeding or upon standing in the cold, the compound of 3 mols theophylline and 2 mols 3-aminomethylpyridine crystallizes out in form of needles.

The compound is isolated from the mother liquor while keeping carbon dioxide and humidity excluded.

Adherent mother liquor may be eliminated either by keeping the compound on clay in a vacuum exsiccator over solid potassium hydroxide or by washing with tetraline and rinsing with petroleum ether or ether.

By adding fresh theophylline to the mother liquor, a further yield of the compound may be obtained. The colorless compound consisting of 3 mols theophylline and 2 mols 3-aminomethylpyridine softens between 155–160° C., no sharp melting point being observed. When maintained in a vacuum while continuously sucking off the gases, the compound is transformed in a new compound consisting of 2 mols theophylline and 1 mol 3-aminomethylpyridine, which novel compound softens between 165-170° C.

Example 2

22 parts by weight of theophylline containing 1 mol of water of crystallisation or an equivalent amount of crystal water free theophylline are suspended in 66.95 or, respectively, 74.65 parts by weight of freshly boiled water, and to this suspension are added 19.86 parts by weight of 3-aminomethylpyridine. There is formed a clear solution $$(d_4^{22°}=1,086)$$

which contains 20% water free theophylline and which is excellently suited as a parenteral theophylline medication.

I claim:

1. The crystalline colorless reaction product of theophylline and 3-aminomethylpyridine containing theophylline and 3-aminomethylpyridine in the proportion 3 mols theophylline to 2 mols 3-aminomethylpyridine.

2. A process for the preparation of a water-soluble compound of theophylline and 3-aminomethylpyridine which comprises reacting theophylline with more than two-thirds its equimolar proportion of 3-aminomethylpyridine and isolating the compound which separates from the mother liquor.

REINHARD SCHLÄPFER.

No references cited.